Patented Nov. 27, 1923.

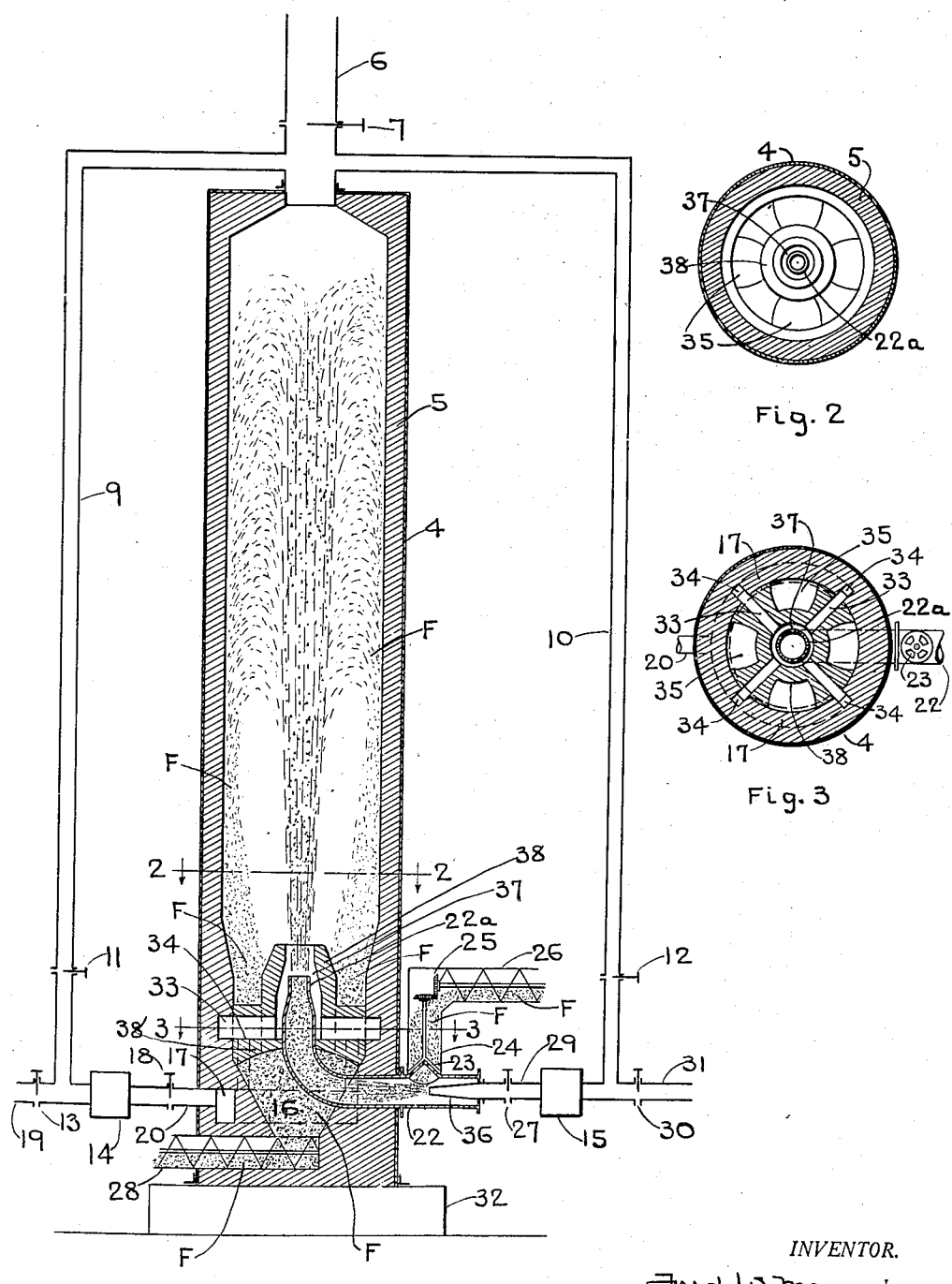

1,475,502

UNITED STATES PATENT OFFICE.

FRED W. MANNING, OF BROOKLYN, NEW YORK, ASSIGNOR TO MANNING REFINING EQUIPMENT CORPORATION, A CORPORATION OF DELAWARE.

METHOD OF REVIVIFYING FINELY-DIVIDED FULLER'S EARTH, BONE CHAR, AND THE LIKE.

Application filed June. 16, 1922. Serial No. 568,790.

*To all whom it may concern:*

Be it known that I, FRED W. MANNING, a citizen of the United States, residing in Brooklyn, county of Kings, State of New York, have invented certain new and useful Improvements in Methods of Revivifying Finely-Divided Fuller's Earth, Bone Char, and the like, of which the following is a specification.

My invention relates to a method of revivifying, by burning or heat treatment, finely divided or powdered earth or clay, fuller's earth, bone char, bone black carbons, activated carbons, diatomaceous earth, as kieselguhr, mineral and vegetable carbons, such as derived from coal, peat, lignite, etc., and from rice hulls, sawdust, etc., and any other similar or equivalent material, or a mixture of two or more of them, commonly used for effecting filtration, decolorization or other treatment of mineral or vegetable oils, fats, greases, waxes, sugar liquors or solutions, glucose and maltose syrups, and other solutions or liquids.

In accordance with my invention, the finely divided or powdered material, as fuller's earth, bone char or the like which has become more or less exhausted or spent as to one or more of its capacities, characteristics or properties by action upon other material, as petroleum, petroleum product, sugar liquor or solution, or the like, is subjected to a jet or blast of hot gases containing products of combustion which transports the finely divided material and in so doing disperses or sprays it, simultaneously raising its temperature to desired degree to effect rapid revivification, the material separating and settling from the gas, without substantial dust loss.

Purifying agents of the character stated after a period of use become charged with matters taken up by adsorption or otherwise and their purifying action slackens or ceases; they are exhausted or spent. The matters taken up are mainly organic in their nature and it is usual in the art to effect revivification or regeneration by heating to char or burn out such matters. In the case of carbonaceous purifying agents like boneblack it is of course desirable not to burn out the carbon of the agent itself in so doing and in the case of fuller's earth and the like it is desirable not to use too much heat. Revivification is therefore an operation requiring an accurate control both of heat and of oxidizing conditions in the atmosphere in contact with the materials under treatment. It is an object of the present invention to provide such an accurate control. In the present method the materials to be treated are dispersed within and carried forward (usually upward) by a flaming jet of combustion gases. In so doing, each particle is surrounded by a hot atmosphere and is, so to speak, individually treated; the time of treatment is accurately controllable by control of the speed and volume of the jet and the temperature is controllable by control of the character of combustion. Presuming air and gas (or oil) to be used in the exact proportions required for combustion, the temperature of the flame will depend on the speed of combustion; and this speed can be regulated, within limits, by an admixture of products of combustion. Using hot products of combustion a certain amount of heat is returned and utilized in using this expedient.

My invention resides in the method and apparatus hereinafter described and claimed.

For an understanding of my method and for an illustration of one of the many forms my apparatus may take, reference is to be had to the accompanying drawings, in which:

Fig. 1 is a vertical sectional view of apparatus embodying my invention.

Fig. 2 is a horizontal sectional view, partly in plan, taken on the line 2—2 of Fig. 1.

Fig. 3 is a horizontal sectional view, partly in plan, taken on the line 3—3 of Fig. 1.

Referring to the drawing, there is shown upon a base 32 a fountain furnace comprising a preferably vertical chamber or shaft formed by the steel shell 4 lined with any suitable refractory material 5. Communicating with the upper end of the furnace is the stack or flue 6, controlled by valve or damper 7, through which the gases are discharged either to atmosphere or to any suitable storage vessel.

Adjacent the bottom of the furnace there is disposed a burner structure for mixing air or the like with combustible material, as gas, oil, or finely divided or powdered fuel. In the example illustrated the burner structure comprises the mixing cone or nozzle member 38, of any suitable material, such as refractory material, having a bore or aperture 37 into which projects the nozzle or outlet end 22ª of the pipe 22. The member 38 is provided with a plurality of passages 33 communicating with bore 37 and downwardly extending passages 34 which communicate with the arcuate or circumferentially incomplete annular passage 17, to which is delivered a component, as air or gas, of the combustible mixture. For example, air is delivered through the pipe 19, controlled by the valve or damper 13, at any suitable pressure, as atmospheric pressure or higher, to the pipe 20, controlled by the valve or damper 18, the pipe 20 delivering the air to the passage 17 from which it passes to the bore 37. There may be employed, if suitable or desirable, a compressor 14 for raising the pressure of the air or gas delivered by the pipe 19.

To pipe 31, controlled by valve or damper 30, is delivered another component of the combustible mixture, as combustible gas, oil, or finely divided or powdered fuel, it being understood that the fuel or combustible material may be delivered through the pipe 31 and that the combustion sustaining gas, as air, may be delivered through the pipe 19, or vice versa. When air or gaseous or vaporous fuel is delivered through the pipe 31, at any suitable pressure, as at atmospheric pressure or higher, its pressure may be further raised by the compressor 15, which then discharges it by the pipe 29, controlled by the valve 27, to the nozzle 36, from which it is discharged into the pipe 22 which discharges it at the nozzle 22ª into the combining nozzle or cone 38, where the components of the combustible mixture come into contact or mixture with each other and are discharged upwardly from the outlet of the nozzle 38 and undergo combustion within the furnace chamber.

The fuller's earth, bone char or other material F, in the form of small grains or granules, and advantageously in a finely divided state or in the state of powder, for example, such as will pass a sieve having 100 or 200 meshes to the inch, is delivered by the spiral or other suitable conveyer 26 into the chute 24, in which is disposed the conical valve 23 co-acting with a conical valve seat, both valve and seat having apertures which come successively into register as the valve 23 is rotated by the gearing 25, which is in turn driven by the shaft of the conveyer 26. The material F is accordingly delivered into the jet issuing from the nozzle 36, and is transported thereby and delivered in mixture with the fuel or air through the nozzle 22ª and mixing or the combining nozzle 38 into the furnace chamber, in mixture with the air or the fuel delivered through the pipe 20 to the interior of the member 38. Beneath the member 38 is the hopper 16 in which the finished or treated material F collects after descent in the furnace chamber and passage through the openings 35 in the member 38. The hopper 16 delivers to a conveyer of any suitable type, as a spiral conveyer 28, which removes the finished material to any suitable destination or storage.

Communicating with the stack or flue 6 are the pipes or flues 9 or 10 communicating, respectively, with the pipes 19 and 31 and controlled, respectively, by the dampers, or valves 11 and 12.

The rate of delivery of fuel or air from the nozzle 36 is variable or adjustable by varying the pressure and quantity of the fuel or gas delivered, the pressure and quantity depending upon the speed of operation of the compressor 15, if used, and the quantity and pressure being also controllable and adjustable by the valves or dampers 27 and 30, or either of them. Similarly, the rate of delivery of air or fuel by the pipe 20 is variable, the quantity and pressure being variable by varying the speed of the compressor 14, if used, and the quantity and pressure are also controllable by the valves or dampers 13 and 18, or either of them. And the rate of delivery of material F is controllable by controlling the speed of rotation of the conveyer 26.

By using hot waste gases from the furnace chamber or stack 6, or by using waste heat from any other suitable source, the temperature of the fluid delivered by the nozzle 36 and by the pipe 20 may be increased, as by introducing, preferably advantageously between the compressor 15 and nozzle 36, and between compressor 14 and the discharge end of the pipe 20, suitable heat exchange apparatus heated by such waste gas or other heating medium.

The operation is as follows:

The rates of delivery of material F, fuel and air are varied or adjusted to produce a mixture giving the desired type of combustion and form a jet or blast, which while burning or undergoing combustion transports, floats and disperses the particles of the material F, simultaneously raising them to the desired temperature to effect the desired changes. The velocity of the gases and of the material F therein carried forward diminishes with the distance from the burner or nozzle structure, and at the same time there occurs a lateral dispersion or spraying, with the result that the particles of material F separate laterally from the axial current of gases and finally fall and accumulate in the hopper 16, from which they are removed by the conveyer 28. The heated material F accumulating in the hopper 16 serves to preheat the air or other gas delivered to the passage 17 and thence to the bore 37 of the member 38.

There is substantially no dust loss, the gas velocity in the upper part of the chamber is so low that the dust particles settle and become mixed with the larger or heavier particles, finding their way to the hopper 16. As an aid in preventing dust loss, the cross section of the furnace chamber above or beyond the jet or flame is, ordinarily made quite large.

The flaming jet in which the material F is transported and dispersed or sprayed may be caused to assume different lengths by suitably adjusting the pressure or pressures of the gas or gases involved; thereby the length of time of heat treatment of the material F. This time however in my method is relatively short. And is measurable in seconds, rather than minutes or hours.

The gases contacting with the material F in the fountain or within the furnace chamber may be of indifferent or neutral character, or may be of a character to effect oxidation or reduction, as may be suitable or desirable, by suitably choosing the nature of the fuel or combustible material and by suitably adjusting its proportion with respect to the amount of air or other combustion sustaining gas employed.

The temperature of the flame or jet or gases within the furnace chamber may also be controlled by suitably proportioning the fuel and air or other combustion sustaining gas.

The rate of combustion and the temperature of the jet or flame may also be varied, as by diminishing them, by introducing a neutral, waste or diluting gas from the stack 6, or from any other suitable source, through the pipe 10 to the pipe 31, the amount of such gas being controllable by the valve or damper 12. Introduction of such gas may be utilized to cause a lengthening of the jet or flame and at the same time reduce its temperature from what would otherwise be the case if such gas were not introduced into the pipe 31 or into mixture with the fuel. The flame, as to its length and temperature, may be further controlled by introducing a diluting, waste or neutral gas with the air or combustion sustaining gas, as by taking gas from the stack or flue 6, or from any other suitable source, and delivering it through the pipe 9, in quantity controllable by the valve or damper 11, and mixing it with the air, so causing a greater dilution of the oxygen supply than obtains in ordinary air.

And by balancing or adjusting the relative quantities of fuel, air and dilution gas, the chemical characteristics of the flame or gases within the furnace chamber may be controlled to effect either a neutral atmosphere, or an oxidizing or reducing atmosphere.

Accordingly, by my method and apparatus, the velocity, height or length of the flame or jet, and therefore the duration of treatment of the material F, the flame or gas temperature within the furnace chamber, and its chemical characteristics, are variable and adjustable.

As indicated, it is advantageous that the jet or flame be projected vertically or substantially so. It should be understood, however, that as to some aspects of my invention this is not so essential, for the jet or flame may in some cases have an upwardly or downwardly inclined direction, or may be substantially horizontal.

It will further be understood that while my invention relates more particularly to the treatment of fuller's earth other purifying agents of similar nature such as bone char or other material which has become more or less exhausted by use, may also be treated by the present process, and in accordance with a broader aspect of my invention, my invention is utilizable also in treating raw or fresh fuller's earth, bone char, etc., before use upon oil, sugar liquor or other solutions or liquids.

The amount of actual combustion which is taking place in the flame jet used for transporting, heating and treating the material varies according to circumstances and may be comparatively little; that is, the volume of hot products of combustion returned to the zone of action by means of either conduit 10 and pump 15 or conduit 9 and pump 14 as the case may be, may be relatively large. In some embodiments of my invention actual combustion may be dispensed with and the material F may be transported and sprayed by a jet of gas which itself has sufficient temperature for purposes of treatment for modification of the material F, without combustion in the presence of or in contact with the material F. The actual combustion may take place somewhere else where burning gases are used. Or, the gas by which the material F is transported may itself have sufficient temperature, or heat may be applied externally to the furnace chamber. In all cases, however, I find it useful to have hot products of combustion in the gaseous jet carrying forward the material to be treated; whether these products of combustion be those originating in the jet itself by combustion therein or be separately added. Usually products of combustion are separately added.

It will further be understood that as to a broader aspect of my invention, the material F may be introduced into the gas jet at any suitable point other than that indicated, it being essential or desirable merely that the material be introduced into the jet for transport and dispersion or spraying thereby and to simultaneously effect the rise in temperature of or application of heat to the material F, in an atmosphere of suitable chemical characteristic.

When fuller's earth is employed in treatment of oil, as vegetable or edible oils, or petroleum or petroleum distillate or product, there is adsorbed on or by the earth particles or deposited thereon or in their pores the color-imparting materials and other impurities, and these impurities by the treatment above described are burned off or oxidized or otherwise modified or changed, whereby the treated or finished fuller's earth is more or less completely restored or revivified and is again utilizable for decolorizing or purifying oil or other liquid. And this procedure may be repeated, alternately using and revivifying the fuller's earth, until no longer useful. But by my method of restoration or revivification the useful life or activity of a given quantity of fuller's earth is very greatly enlarged, thereby effecting great saving and reducing the total quantity of new or fresh earth required. After restoration or revivification, there may be added to the earth fresh or raw earth, previously heat treated or not, in quantity sufficient to make up for losses or in any suitable greater quantity as may be suitable or desirable.

My method and apparatus are particularly suitable for the treatment of finely divided fuller's earth, such, for example, as will pass a 100 or 200 mesh screen either when raw or fresh, and particularly after use upon liquid, as oil, including vegetable and edible oils; and my invention is particularly applicable to fuller's earth used in finely divided state in decolorization and purification of mineral oil, as petroleum or petroleum distillate or product, as described in my application Ser. No. 568,789, filed June 16, 1922.

The bone char and other materials and their equivalents herein referred to are similarly treated to effect suitable modification or change to restore or increase activity and life. For example, bone char in fine granular or finely divided state which has been used upon sugar liquors or solutions, or other liquids, to an extent or for a period which would otherwise necessitate its discharge to waste, may be treated as herein described to restore its utility and activities and render it suitable for re-use.

My method and apparatus are of particular utility for treating or revivifying bone char or similar material, particularly when in finely divided state, and when such as will pass a 100 or 200 mesh screen, particularly when utilized in connection with sugar and similar solutions or liquids, as described in my application Ser. No. 608,448, filed December 22, 1922.

What I claim is:

1. The method of treating purifying materials of the character described, which comprises transporting and dispersing particles of the material in a gaseous stream, containing products of combustion, and simultaneously raising the temperature of said particles.

2. The method of treating purifying materials of the character described, which comprises transporting and dispersing particles of the material in a gaseous jet containing products of combustion, simultaneously raising the temperature of said particles, and settling the particles by gravity.

3. The method of treating purifying materials of the character described, which comprises transporting and dispersing particles of said material by a hot gaseous stream containing products of combustion.

4. The method of treating purifying materials of the character described, which comprises transporting and dispersing particles of said material by a stream of gaseous material undergoing combustion.

5. The method of treating purifying materials of the character described, which comprises mixing a combustion-supporting gas with fuel, and transporting and dispersing particles of said material by said mixture while undergoing combustion.

6. The method of treating purifying materials of the character described, which comprises mixing a combustion-supporting gas with fuel, transporting and dispersing particles of said material by said mixture while undergoing combustion, and introducing products of said combustion into said mixture.

7. The method of treating purifying materials of the character described, which comprises transporting and dispersing particles of the material in an upwardly directed gaseous jet containing products of combustion, simultaneously raising the temperature of said particles, and settling the particles by gravity.

8. The method of treating purifying materials of the character described, which comprises transporting and dispersing particles of the material in a substantially vertical gaseous jet containing products of combustion, simultaneously raising the temperature of said particles, and settling the particles by gravity.

9. The method of revivifying used fuller's earth, which comprises transporting and dispersing particles of said earth in a gaseous stream containing products of combustion, and simultaneously raising the temperature of said particles.

10. The method of revivifying used fuller's earth, which comprises transporting and dispersing particles of said earth in a gaseous jet undergoing combustion, and settling the particles by gravity.

11. The method of revivifying used purifying materials of the character described and consisting largely of particles capable of passing a 100 mesh screen, which comprises transporting and dispersing the particles of said material in a gaseous stream, and simultaneously raising the temperature of said particles.

12. The method of revivifying used purifying materials of the character described and consisting largely of particles capable of passing a 100 mesh screen, which comprises transporting and dispersing particles of said material in a jet of gaseous material undergoing combustion, and settling the particles of said material by gravity.

In testimony whereof I have hereunto affixed my signature this 15th day of June, 1922.

FRED W. MANNING.